US008848717B2

(12) United States Patent
Yan et al.

(10) Patent No.: US 8,848,717 B2
(45) Date of Patent: Sep. 30, 2014

(54) METHOD, APPARATUS, AND NETWORK SYSTEM FOR MULTI-PORT LOAD SHARING

(75) Inventors: Qinghua Yan, Shenzhen (CN); Lu Bai, Duesseldorf (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 599 days.

(21) Appl. No.: 13/209,043

(22) Filed: Aug. 12, 2011

(65) Prior Publication Data

US 2011/0299396 A1    Dec. 8, 2011

Related U.S. Application Data

(63) Continuation of application No. PCT/CN2010/070632, filed on Feb. 11, 2010.

(30) Foreign Application Priority Data

Feb. 13, 2009    (CN) .......................... 2009 1 0009026

(51) Int. Cl.
 H04L 12/28 (2006.01)
 H04L 12/709 (2013.01)
 H04L 12/703 (2013.01)
 H04L 12/803 (2013.01)
 H04Q 11/00 (2006.01)
 H04L 29/08 (2006.01)
 H04L 29/06 (2006.01)

(52) U.S. Cl.
 CPC .............. *H04L 45/245* (2013.01); *H04L 45/28* (2013.01); *H04L 47/125* (2013.01); *H04Q 11/0062* (2013.01); *H04L 67/1002* (2013.01); *H04L 69/14* (2013.01); *H04Q 2011/0081* (2013.01); *Y02B 60/33* (2013.01)
 USPC ........... 370/392; 370/218; 370/231; 370/235; 370/401

(58) Field of Classification Search
 CPC ............ H04J 3/1652; H04J 2203/0001; H04J 3/1664; H04L 5/003; H04L 5/0094; H04L 45/245
 USPC ......... 370/218, 229, 231, 235, 254, 389, 392, 370/401
 See application file for complete search history.

(56) References Cited

U.S. PATENT DOCUMENTS

| 6,298,061 | B1 | 10/2001 | Chin et al. |
| 6,473,424 | B1 | 10/2002 | DeJager et al. |

(Continued)

FOREIGN PATENT DOCUMENTS

| CN | 1369991 A | 9/2002 |
| CN | 101179510 A | 5/2008 |

(Continued)

OTHER PUBLICATIONS

English Translation of granted claims in corresponding Chinese Patent Application No. 200910009026.1 (including verification of translation).

(Continued)

*Primary Examiner* — Benjamin H Elliott, IV
(74) *Attorney, Agent, or Firm* — Brinks Gilson & Lione

(57) ABSTRACT

The present invention relates to network communications technologies, and discloses a method, an apparatus, and a network system for multi-port load sharing. The method includes: receiving packets destined for a destination; searching an address port mapping table for corresponding logical egress port information according to destination address information carried in the packets; searching a logical port table for information about a corresponding load sharing group according to the logical egress port information, where the load sharing group includes at least two physical ports and each physical port corresponds to at least two subchannels; and encapsulating the packets into at least one subchannel corresponding to each physical port in the load sharing group respectively according to a preset load sharing policy, and forwarding the packets to the destination through the corresponding physical port. The embodiments of the present invention are applicable to network communications.

13 Claims, 13 Drawing Sheets

(56) References Cited

U.S. PATENT DOCUMENTS

| | | |
|---|---|---|
| 7,072,293 B2 * | 7/2006 | Hunter et al. .................. 370/218 |
| 7,346,277 B2 | 3/2008 | Atkinson et al. |
| 2002/0109879 A1 | 8/2002 | Wing So |
| 2003/0131131 A1 | 7/2003 | Yamada et al. |
| 2004/0037278 A1 * | 2/2004 | Wong et al. ................... 370/389 |
| 2005/0244158 A1 | 11/2005 | Luft |
| 2007/0201380 A1 | 8/2007 | Ma et al. |
| 2007/0214282 A1 | 9/2007 | Sen |
| 2007/0217345 A1 | 9/2007 | Jujii et al. |
| 2008/0037544 A1 * | 2/2008 | Yano et al. ................... 370/392 |
| 2011/0299396 A1 * | 12/2011 | Yan et al. ..................... 370/235 |

FOREIGN PATENT DOCUMENTS

| | | |
|---|---|---|
| CN | 101247351 A | 8/2008 |
| CN | 101257447 A | 9/2008 |
| CN | 101355519 A | 1/2009 |
| CN | 101605091 A | 12/2009 |
| CN | 101605091 B | 2/2012 |

OTHER PUBLICATIONS

Written Opinion of the International Searching Authority issued in corresponding PCT Patent Application No. PCT/CN2010/070632, mailed May 20, 2010.

"Amendment to Carrier Sense Multiple Access with Collision Detection (CSMA/CD) Access Method and Physical Layer Specifications—Aggregation of Multiple Link Segments." LAN MAN Standards Committee of the IEEE Computer Society; Approved Mar. 30, 2000.

Chigan, Chunxiao et al. "Cost Effectiveness of Joint Multilayer Protection in Packet-Over-Optical Networks." Journal of Lightwave Technology, vol. 21. No. 11. Nov. 2003:2694-2704.

Office Action issued in corresponding Chinese Patent Application No. 200910009026.1; mailed Feb. 24, 2011.

International Search Report issued in corresponding PCT Application No. PCT/CN2010/070632; mailed May 20, 2010.

Notice of Allowance issued in corresponding Chinese Patent Application No. 200910009026.1 (including English translation); mailed Nov. 29, 2011.

English Translation of granted claims in corresponding Chinese Patent Application No. 200910009026.1 (including verification of translation). ~Mar. 26, 2012.

* cited by examiner

Optical link of network ----------
UNI link ————————

| | |
|---|---|
| Optical link of network | ---------- |
| Route for sending packets from RA to RB, RC, RD, and RE through A2 | ————— |
| Route for sending packets from RA to RB, RC, RD, and RE through A1 | ·············· |

Set up a physical route of the tunnel ———

Single-hop route that shares
the same physical channel   ••••••••••••••••••••••••••••••••••••
but has different subchannels

METHOD, APPARATUS, AND NETWORK SYSTEM FOR MULTI-PORT LOAD SHARING

CROSS-REFERENCE TO RELATED APPLICATIONS

This application is a continuation of International Application No. PCT/CN2010/070632, filed on Feb. 11, 2010, which claims priority to Chinese Patent Application No. 200910009026.1, filed on Feb. 13, 2009, both of which are hereby incorporated by reference in their entireties.

FIELD OF THE INVENTION

The present invention relates to network communications technologies, and in particular, to a method, an apparatus, and a network system for multi-port load sharing.

BACKGROUND OF THE INVENTION

In the current network structure of telecom operators, optical devices are used to make physical transmission networks, and data devices, as user-layer devices, are connected to the optical devices. The connection between data devices is implemented through a physical channel of the optical devices. Data devices such as routers are connected with network devices such as optical devices through a User Network Interface (UNI), and the link between a data device and a network device is a UNI link.

Common UNI types include: Ethernet interface, Packet over SDH/SONET (POS) interface (a mapping interface for transmitting packets on SDH/SONET), and Optical Transport Network (OTN) interface, where SDH/SONET is short for Synchronous Digital Hierarchy/Synchronous Optical Network. The common rates of an Ethernet interface are 1 Gbps, 10 Gbps, and 100 Gbps which is being defined by standardization organizations; the rates of a POS interface are 155 Mbps, 622 Mbps, 2.5 Gbps, 10 Gbps, and 40 Gbps; and the rates of an OTN interface are 2.5 Gbps, 10 Gbps, 40 Gbps, and 100 Gbp which is being defined by standardization organizations.

The data devices are primarily capable of forwarding the packets from the link layer or the network layer through a proper port according to the routing algorithm; and the optical devices are capable of configuring cross connections on the physical channel layer according to service requirements, selecting a corresponding port and extending the cross connections to other optical devices through fibers.

Link aggregation is put forward in the IEEE 802.3ad, and refers to combining two or more data channels into a single channel which appears as a single logical link of higher bandwidth. Link aggregation generally meets requirements of high-bandwidth connections, and protects ports in a group through redundant physical ports. The main idea of the technology of link aggregation is to allocate Media Access Control (MAC) addresses of all physical ports in a group to a same network layer port, namely, multiple ports have only one Internet Protocol (IP) address and only one destination IP address. Such physical ports are configured as a trunked port, and connected with a corresponding trunked port on the opposite side, therefore an aggregated link is formed.

As shown in FIG. 1, the physical ports D1-P1 and D1-P2 of the data device 101 are configured as a trunked port; the physical ports D2-P1 and D2-P2 of the data device 102 on the opposite side are configured as a corresponding trunked port. A physical link is formed between the physical port D1-P1 of the data device 101 and the physical port D2-P1 of the opposite data device 102, and another physical link is formed between the physical port D1-P2 of the data device 101 and the physical port D2-P2 of the opposite data device 102. The physical links between trunked ports of the two data devices forms an aggregated link. So that an aggregated link is actually composed of two physical links. When one of the physical links fails, the other physical link works instead to bring a protective effect. The two physical links have the same source and the same destination, namely, the two physical links have the same source IP address and the same destination IP address.

The link aggregation in the prior art is defective in: because two physical links directed to the same destination need to be bound together to bring a protective effect, the UNI links directed to different destinations cannot be protected; and single-layer network protection does not prevent the UNI link failure from affecting the whole network. With the growth of network bandwidth, the port capacity is increasing, and the telecom operators impose higher and higher requirements on network reliability, Quality of Service (QoS) of the data service, network expansion, and initial construction costs. Therefore, the prior art cannot meet the operator's requirements on networks.

SUMMARY OF THE INVENTION

The embodiments of the present invention provide a multi-port load sharing method, apparatus, and network system to protect UNI links directed to different destinations, prevent a UNI link failure from affecting the whole network, and avoid network oscillation.

The embodiments of the present invention are based on the following technical solutions:

A multi-port load sharing method provided in an embodiment of the present invention includes:

receiving packets destined for a destination;

searching an address port mapping table for corresponding logical egress port information according to destination address information carried in the packets;

searching a logical port table for information about a corresponding load sharing group according to the logical egress port information, where the load sharing group includes at least two physical ports and each physical port corresponds to at least two subchannels; and encapsulating the packets into at least one subchannel corresponding to each physical port in the load sharing group respectively according to a preset load sharing policy, and forwarding the packets to the destination through the corresponding physical port.

A data device for implementing multi-port load sharing provided in an embodiment of the present invention includes:

a receiving module, configured to receive packets destined for a destination;

an address port mapping table searching module, configured to search an address port mapping table for corresponding logical egress port information according to destination address information carried in the packets;

a logical port table searching module, configured to search a logical port table for information about a corresponding load sharing group according to the logical egress port information, where the load sharing group includes at least two physical ports and each physical port corresponds to at least two subchannels; and a sending module, configured to encapsulate the packets into at least one subchannel corresponding to each physical port in the load sharing group respectively according to a preset load sharing policy, and forward the packets to the destination through the corresponding physical port.

A network system for implementing multi-port load sharing provided in an embodiment of the present invention includes a data device and a network device.

The data device is configured to: receive packets destined for a destination; search an address port mapping table for corresponding logical egress port information according to destination address information carried in the packets; search a logical port table for information about a corresponding load sharing group according to the logical egress port information, where the load sharing group includes at least two physical ports and each physical port corresponds to at least two subchannels; and encapsulate the packets into at least one subchannel corresponding to each physical port in the load sharing group respectively according to a preset load sharing policy, and forward the packets to the network device through the corresponding physical port.

The network device is configured to aggregate the packets according to the sending direction of the packets and send the packets to the destination, or send the packets to the destination directly.

Through the method, apparatus, and network system for multi-port load sharing provided in the embodiments of the present invention, in the same load sharing group, the packets are shared by at least one subchannel corresponding to more than one physical port respectively, as a result, the packets arrive at the same or different network device ports through different subchannels. When a UNI link fails, the packets may arrive at the destination address through other subchannels, therefore, the embodiments improve the network reliability and as a result the UNI links connected to different destinations are protected. The packets may be transmitted through multiple subchannels in multiple physical ports, therefore, the embodiments solve the problem of deficient large-capacity ports in a core network, reduce initial investments at the stage of network construction, and accomplish smooth expansion.

BRIEF DESCRIPTION OF THE DRAWINGS

To describe the technical solutions in the embodiments of the present invention or the prior art more clearly, the following describes the accompanying drawings involved in the description of the embodiments of the present invention or the prior art. Apparently, the accompanying drawings described below are only some embodiments of the present invention. Persons skilled in the art may derive other drawings from the accompanying drawings without creative effort.

DETAILED DESCRIPTION OF THE EMBODIMENTS

The following describes a method, an apparatus and a network system for multi-port load sharing in the embodiments of the present invention with reference to the accompanying drawings.

Evidently, the embodiments described are only a part of the embodiments of the present invention. All other embodiments, which may be derived by those skilled in the art from the embodiments described without creative effort, shall fall within the protection scope of the present invention.

Figure 1:
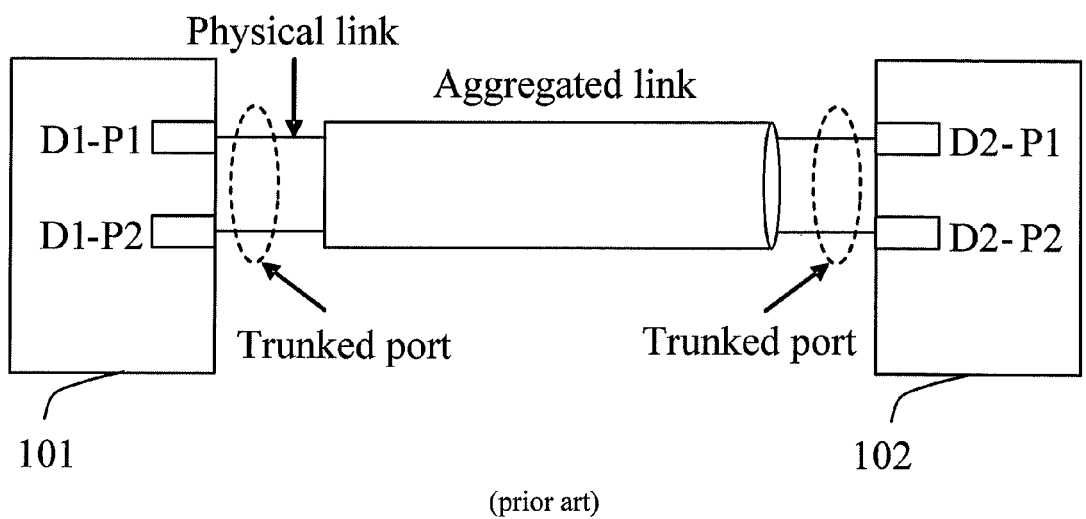
FIG. 1 shows link aggregation in the prior art.
Figure 2:
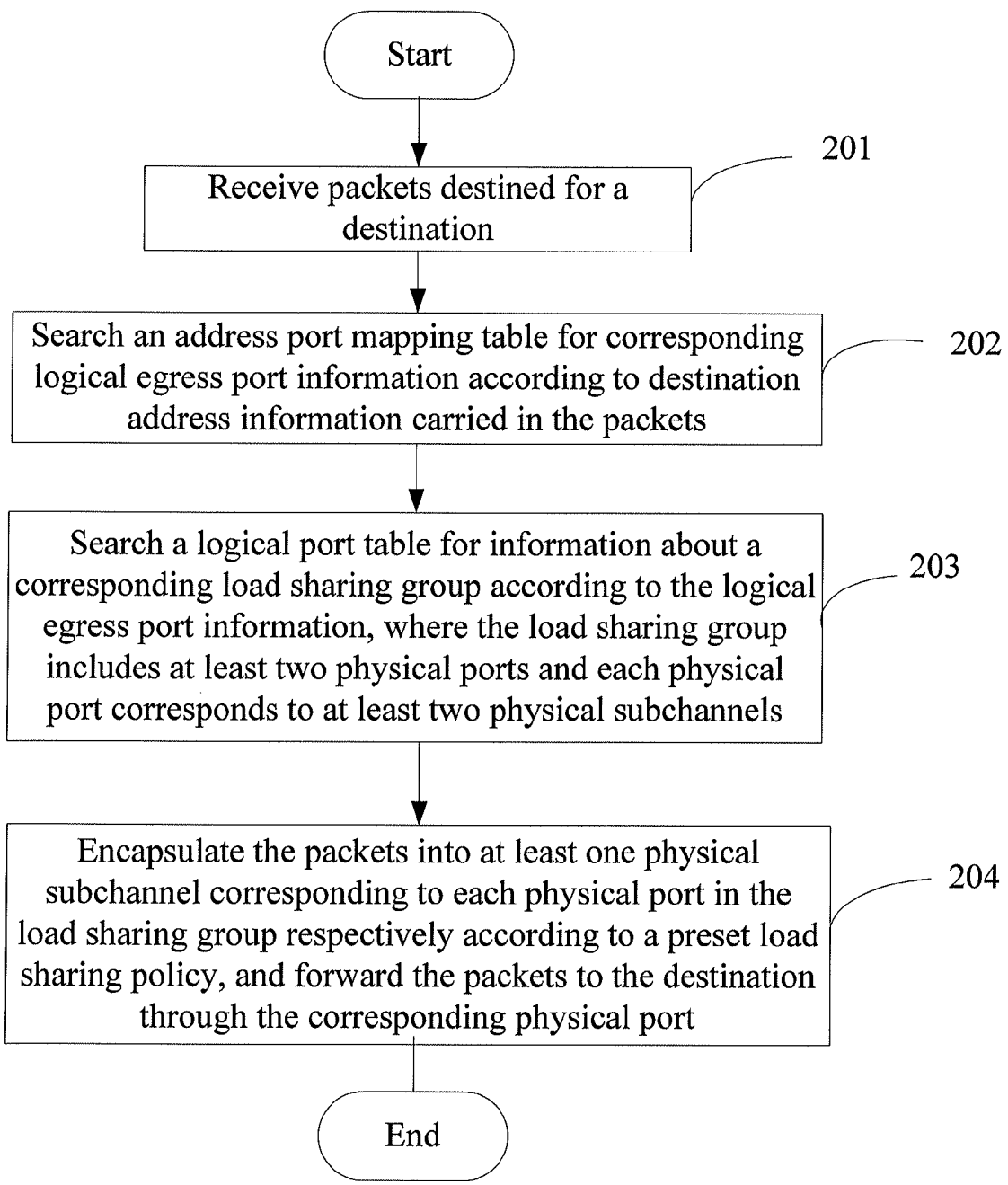
FIG. 2 is a flowchart of a multi-port load sharing method in an embodiment of the present invention.

As shown in FIG. 2, a multi-port load sharing method provided in an embodiment of the present invention includes the following steps:

201. Receive packets destined for a destination.

202. Search an address port mapping table for corresponding logical egress port information according to destination address information carried in the packets.

The destination address information may be an IP address or MAC address of the destination; accordingly, the address port mapping table may be a routing table or MAC table.

203. Search a logical port table for information about a corresponding load sharing group according to the logical egress port information, where the load sharing group includes at least two physical ports and each physical port corresponds to at least two physical subchannels.

204. Encapsulate the packets into at least one physical subchannel corresponding to each physical port in the load sharing group respectively according to a preset load sharing policy, and forward the packets to the destination through the corresponding physical port.

The load sharing group in this embodiment generally includes multiple physical ports, and is therefore often referred as a multi-port load sharing group. Optionally, in the load sharing based on the method in this embodiment, the subchannels corresponding to the physical port are not limited to physical subchannels, and may be logical subchannels, or may include both logical subchannels and subchannels of a physical-layer transmission frame structure. Because the method in the foregoing embodiment implements load sharing through at least one physical subchannel corresponding to different physical ports, the load sharing group may also be understood as a collection of physical subchannels for sharing packets. Specifically, the subchannels include: Optical Data Unit (ODU) series corresponding to an OTN interface, and Virtual Container (VC-4) series corresponding to the POS interface, or channelized interfaces corresponding to the 100GE interface. For example, the physical subchannel may be VC-4 in an STM-4 frame.

For ease of description, the Multi-Port load sharing technology (Multiple ports Participation of Payload Plan) is referred to as an MP4 technology, and the multi-port load sharing group is referred to as an MP4 group.

On the basis of the foregoing embodiment, the packets destined for the same destination may be shared by different physical ports in an MP4 group. In addition, the packets in all physical subchannels corresponding to the same physical port may be sent to the same or different destinations. The capacity of a logical port may be the same as or different from the capacity of a physical port, and the number of logical ports may be equal to or unequal to the number of physical ports.

The MP4 method provided in this embodiment may be implemented by a data device such as a router and a switch. The method provided in this embodiment is also applicable to a network scenario of transmitting data across a transmission network, where the transmission network may be an OTN and the network devices in the transmission network are optical devices. The method includes: The data device on the source side receives packets destined for a destination from a source; searches an address port mapping table for corresponding logical egress port information according to destination address information carried in the packets; further searches a logical port table for a corresponding load sharing group according to the logical egress port information, where the load sharing group includes at least two physical ports and each physical port corresponds to at least two physical subchannels; and encapsulates the packets into at least one physical subchannel corresponding to each physical port in the load sharing group respectively according to a preset load sharing policy, and forwards the packets to the OTN through the corresponding physical port; and the OTN aggregates the packets according to the sending direction of the packets and then forwards the packets to the destination, or forwards the packets to the destination directly. The OTN forwards the packets to the destination directly in this way: if both the data device on the source side and the data device on the destination side support the MP4 method provided in this embodiment, the OTN sends the packets from different physical ports of the source-side data device to the physical port corresponding to the destination-side data device; and the destination-side data device decapsulates the packets to obtain the destination address, and sends the packets to the destination according to the destination address. The OTN includes multiple optical devices. The packets destined for the same destination in the MP4 group may be sent to different physical ports of the same optical device or physical ports of different optical devices. The packets destined for the same destination in the MP4 group may be aggregated by any optical device in the OTN and then forwarded to the data device on the destination side; or may be forwarded to the data device on the destination side directly.

Figure 3:
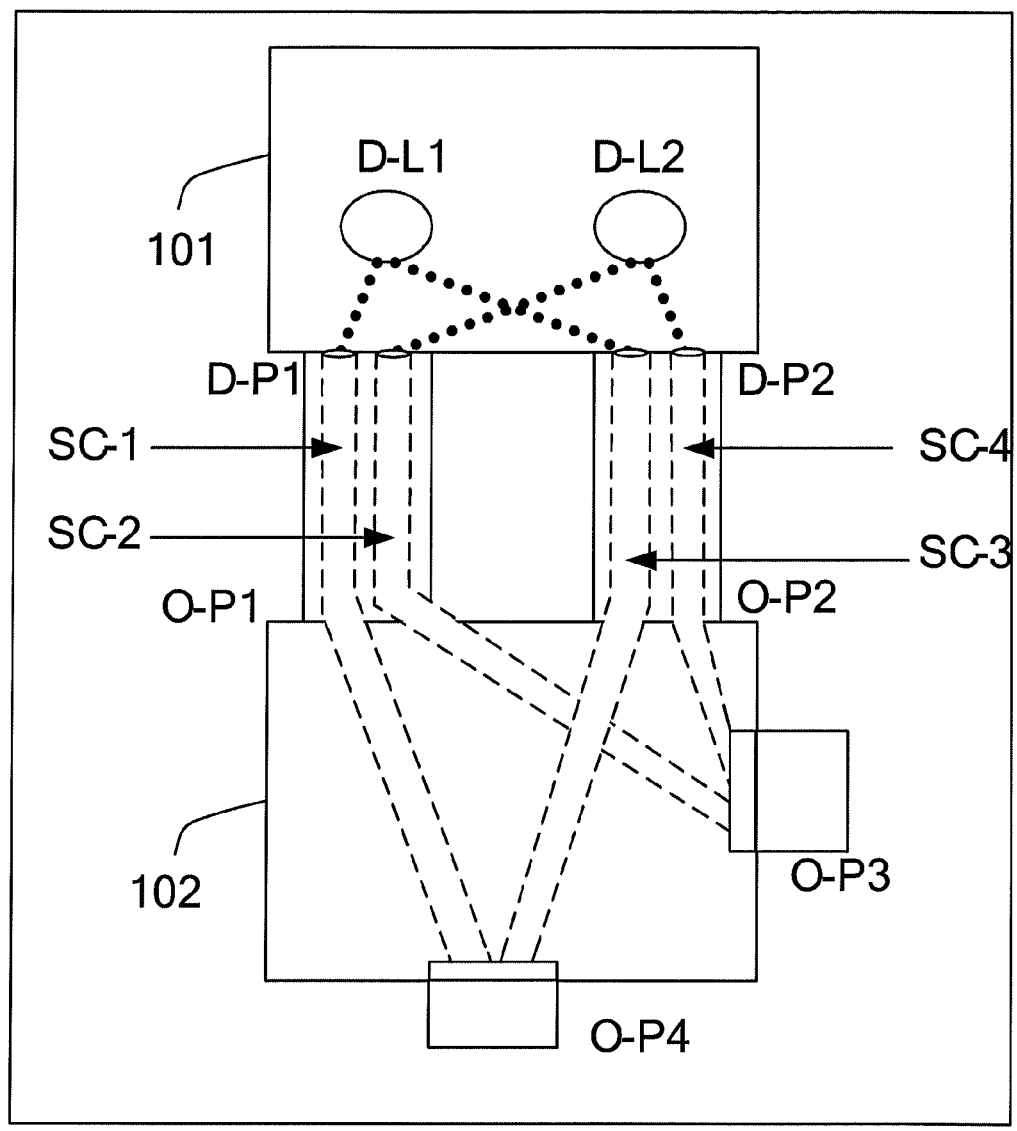
FIG. 3 shows a network model of a multi-port load sharing method in an embodiment of the present invention.

FIG. 3 shows a network model of a multi-port load sharing method in an embodiment of the present invention. As shown in FIG. 3, the data device 101 includes two logical ports and two physical ports. The two logical ports are D-L1 and D-L2, and the two physical ports are D-P1 and D-P2. Each physical port corresponds to two physical subchannels. That is, the physical port D-P1 corresponds to physical subchannels SC-1 and SC-2, and the physical port D-P2 corresponds to physical subchannels SC-3 and SC-4. The data device 101 is connected with the optical device 102 in the OTN, and the physical port D-P1 of the data device 101 is connected with the physical port O-P1 of the optical device 102 to form a UNI link. The other physical port D-P1 of the data device 101 is connected with the physical port O-P2 of the optical device 102 to form another UNI link. The load capacity sum of the physical subchannels SC-1 and SC-2 may occupy all bandwidth of the UNI link from D-P1 to O-P1. The percentage of bandwidth occupied by physical subchannels SC-1 and SC-2 may be adjusted according to specific requirements through static configuration or dynamic configuration. For example, the bandwidth occupied by SC-1 may be adjusted to be the same as or different from the bandwidth occupied by SC-2. The adjustment is the same with physical subchannels SC-3 and SC-4. Here the physical ports D-P1 and D-P2 are configured into one MP4 group.

According to the MP4 method described above, the packets that pass through the logical port D-L1 of the data device 101 are encapsulated into physical subchannels SC-1 and SC-3, and forwarded through the physical ports D-P1 and D-P2 respectively. The packets encapsulated in the physical subchannels SC-1 and SC-3 are sent to the optical device along two UNI links respectively. The optical device receives the packets from the corresponding physical ports O-P1 and OP-2 respectively, aggregates the packets in the physical subchannels SC-1 and SC-3 according to the service flow direction of the packets, and then sends the packets out from physical port O-P4 of the optical device. Likewise, the packets that pass through the logical port D-L2 of the data device 101 are encapsulated into physical subchannels SC-2 and SC-4, and forwarded through the corresponding physical ports D-P1 and D-P2 respectively. The packets encapsulated in the physical subchannels SC-2 and SC-4 are sent to the optical device along two UNI links respectively. The optical device receives the packets from the corresponding physical ports O-P1 and O-P2 respectively, aggregates the packets in the physical subchannels SC-2 and SC-4 according to the service flow direction of the packets, and then sends the packets out from physical port O-P3 of the optical device.

The method for obtaining the physical subchannels for bearing the forwarded packets at logical ports D-L1 and D-L2 may be based on the existing trunking technology, or Equity Cost Multi-path (ECMP) technology, or other practical solutions.

In practical network applications, the number of physical ports in an MP4 group may be more than two that are illustrated in FIG. 3, and the MP4 group may be configured according to the same principles. Optionally, the subchannels corresponding to the physical ports in this embodiment of the present invention are not limited to the physical subchannels, but may be logical subchannels, or may include both logical subchannels and subchannels of a physical-layer transmission frame structure. Specifically, the signal mapping format of the physical port may be applied to all interfaces that may be channelized, for example, POS interface or OTN interface; and this design is applicable to the hierarchical rate of all POS interfaces or OTN interfaces. The 100GE interface that is being developed by the standardization organization is 10×10GE or 4×25GE, and may also be channelized.

Different MP4 solutions may be implemented in different signal mapping ports and transmission rates. The MP4 solutions may be configured manually in a static way, or configured by a device intelligently in a dynamic way. With the General Multi-protocol Label Switching (GMPLS) protocol being applied in network devices, the MP4 solution makes it possible to implement dynamic cross connection on optical devices through the GMPLS protocol. On the network node that does not support the GMPLS protocol, the cross connection may be configured manually according to the MP4 solution to accomplish the same effect.

In this embodiment, the capacities of the subchannels corresponding to different physical ports may be the same or different. If the load sharing group includes more than one physical port, the capacities of all physical ports may be the same or different.

According to the factors such as physical port capacity, logical port capacity and load sharing factor, four MP4 group configuration solutions are put forward. The following expounds the four MP4 configuration solutions.

Solution 1 is: average load sharing when the ports have the same capacity.

As shown in FIG. 3, it is assumed that the two physical ports D-P1 and D-P2 of the data device 101 in connection with the optical device 102 are 40G OTN interfaces. On the data device, D-P1 and D-P2 are configured into an MP4 group that includes two ports, and the load from the logical ports D-L1 and D-L2 are allocated to the two physical ports averagely.

After the 40G OTN interface that bears ODU3 is channelized, the 40G OTN interface may include four physical subchannels that bear ODU2, with each physical subchannel bearing a load of 10G. The loads on the four physical subchannels are marked as #1 ODU2, #2 ODU2, #3 ODU2, and #4 ODU2 respectively.

Table 1 illustrates the port load sharing channel relation of an MP4 group composed of two 40G OTN interfaces. The two physical ports D-P1 and D-P2 share the load of the logical port averagely at a fifty-fifty percentage.

TABLE 1

Load balance configuration of 40G OTN interfaces

| Physical port of data device | Logical port of data device | Physical port load flag | Physical port of optical device |
|---|---|---|---|
| D-P1 ODU340G | D-L1 | #1 ODU2 10G<br>#2 ODU2 10G | O-P1 ODU340G |
|  | D-L2 | #3 ODU2 10G<br>#4 ODU2 10G |  |
| D-P2 ODU340G | D-L1 | #1 ODU2 10G<br>#2 ODU2 10G | O-P2 ODU340G |
|  | D-L2 | #3 ODU2 10G<br>#4 ODU2 10G |  |

Solution 2 is: non-average load sharing when the ports have the same capacity.

Table 2 illustrates the unbalanced load sharing channel relation of an MP4 group composed of two 40G OTN interfaces. The physical ports D-P1 and D-P2 share the load of the logical port at a percentage of 3:1.

TABLE 2

Load unbalance configuration of 40G OTN interfaces

| Physical port of data device | Logical port of data device | Physical port load flag | Physical port of optical device |
|---|---|---|---|
| D-P1 ODU340G | D-L1 | #1 ODU2 10G<br>#2 ODU2 10G<br>#3 ODU2 10G | O-P1 ODU340G |
|  | D-L2 | #4 ODU2 10G |  |
| D-P2 ODU340G | D-L1 | #1 ODU2 10G | O-P2 ODU340G |
|  | D-L2 | #2 ODU2 10G<br>#3 ODU2 10G<br>#4 ODU2 10G |  |

Solution 3 is: load sharing when the physical ports of different capacities are mixed.

Table 1 and table 2 illustrate the load sharing solutions when the ports in the MP4 group have the same capacity. In practice, the physical ports of different capacities may be configured into an MP4 group. Table 3 illustrates the load sharing of three 40G OTN interfaces and one 100G OTN interface. It is assumed that a 100G OTN interface is channelized into ten 10G subchannels, and the optical device also has three 40G ports and one 100G port.

TABLE 3

Hybrid configuration of 40G ports and 100G ports

| Physical port of data device | Logical port of data device | Physical port load flag | Physical port of optical device |
|---|---|---|---|
| D-P1 ODU340G | D-L1 | #1 ODU2 10G | O-P1 ODU340G |
|  | D-L2 | #2 ODU2 10G |  |
|  | D-L3 | #3 ODU2 10G |  |
|  | D-L4 | #4 ODU2 10G |  |
| D-P2 ODU340G | D-L1 | #1 ODU2 10G | O-P2 ODU340G |
|  | D-L2 | #2 ODU2 10G |  |
|  | D-L3 | #3 ODU2 10G |  |
|  | D-L4 | #4 ODU2 10G |  |
| D-P3 ODU340G | D-L1 | #1 ODU2 10G | O-P3 ODU340G |
|  | D-L2 | #2 ODU2 10G |  |
|  | D-L3 | #3 ODU2 10G |  |
|  | D-L4 | #4 ODU2 10G |  |
| D-P4 ODU4100G | D-L1 | #1 ODU2 10G | O-P4 ODU4100G |
|  | D-L2 | #2 ODU2 10G |  |
|  | D-L3 | #3 ODU2 10G |  |
|  | D-L4 | #4 ODU2 10G |  |
|  | D-L4 | #5 ODU2 10G |  |
|  | D-L4 | #6 ODU2 10G |  |
|  | D-L4 | #7 ODU2 10G |  |
|  | D-L4 | #8 ODU2 10G |  |
|  | D-L4 | #9 ODU2 10G |  |
|  | D-L4 | #10 ODU2 10G |  |

Solution 4 is: load sharing when the capacity of the logical port is different from the capacity of the physical port.

When the capacity of the physical port of the data device is different from the capacity of the logical port, the load sharing group is still applicable. Table 4 illustrates the load sharing solution when the data device has four 10G logical ports and two 40G physical ports, and the optical device has two 40G physical ports.

TABLE 4

Load configuration of 40G physical ports and 10G logical ports

| Physical port of data device | Logical port of data device | Physical port load flag | Physical port of optical device |
|---|---|---|---|
| D-P1 ODU340G | D-L1 | #1 ODU2 10G | O-P1 ODU340G |
|  | D-L2 | #2 ODU2 10G |  |
|  | D-L3 | #3 ODU2 10G |  |
|  | D-L4 | #4 ODU2 10G |  |
| D-P2 ODU340G | D-L1 | #1 ODU2 10G | O-P2 ODU340G |
|  | D-L2 | #2 ODU2 10G |  |
|  | D-L3 | #3 ODU2 10G |  |
|  | D-L4 | #4 ODU2 10G |  |

Other rates of the OTN interface, for example, 10G and 100G, may be used to configure the corresponding physical subchannels in the same way. Likewise, channelized POS interfaces may also be configured according to the corresponding principles. For example, the 40G POS interfaces (namely, on an STM-256/OC-768 level) may share load in the physical subchannels at a 10G rate, namely, at a capacity of VC-4-64c. In the POS interfaces of lower rates, the load sharing solution may be configured through the physical subchannel VC-4.

According to the method disclosed herein, the load sharing may be configured for any interfaces that may emerge in the future regardless of the rate of the interface as long as the interface may be channelized into physical subchannels.

In network application, a physical port interface generally includes 2, 4, 8, or 16 ports. According to the method disclosed herein, the number of physical ports in an MP4 group may be any number greater than or equal to 1.

In network application, the link is more reliable if the MP4 group is composed of ports in different boards.

The following expounds how the multi-port load sharing method under the present invention is applied in different scenarios, taking a network model of transmitting data across an OTN as an example. In the following six application instances, RA, RB, RZ, and RX are data devices; OA, OB, OC, OD, OE, OZ, OX, OA1, and OA2 are optical devices connected with the corresponding data devices; A1, A2, B1, B2, Z1, and Z2 are UNI links in different locations. The optical devices are interconnected through optical links.

Application Instance 1

Here is an application instance of using the multi-port load sharing method under the present invention to enhance network reliability.

Figure 4:
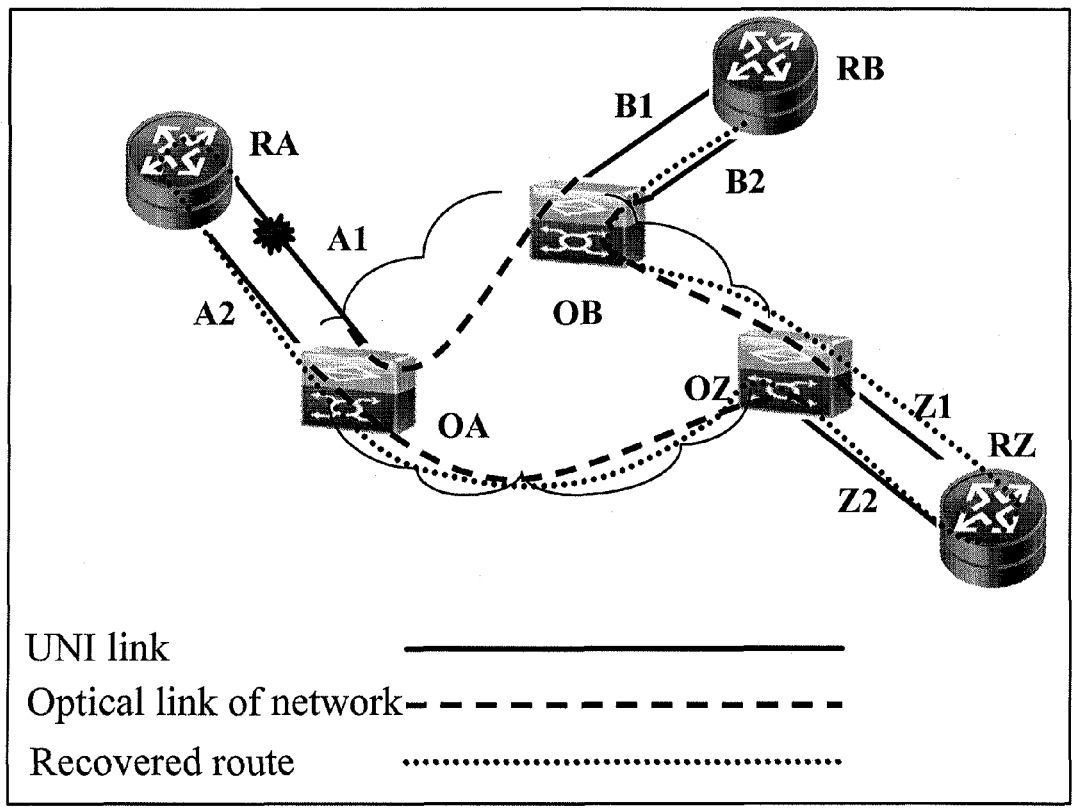
FIG. 4 shows route recovery not based on the multi-port load sharing method in an embodiment of the present invention.

FIG. 4 shows route recovery not based on the multi-port load sharing method in an embodiment of the present invention. When the UNI links A1 and A2 between the data device RA and the optical device OA are normal, the route from the data device RA to the data device RB is RA→A1→OA→OB→B1→RB. When the UNI link A1 fails, the route is disconnected between the data device RA and the data device RB. Because the MP4 solution under the present invention is not applied, after the data device RA perceives the fault, the data device RA needs to search for the route throughout the network again in order to recover the route between the RA and the RB. The selected standby route passes through multiple intermediate devices, and the standby route is RA→A2→OA→OZ→Z2→RZ→Z1→OZ→OB→B2→RB.

Figure 5:
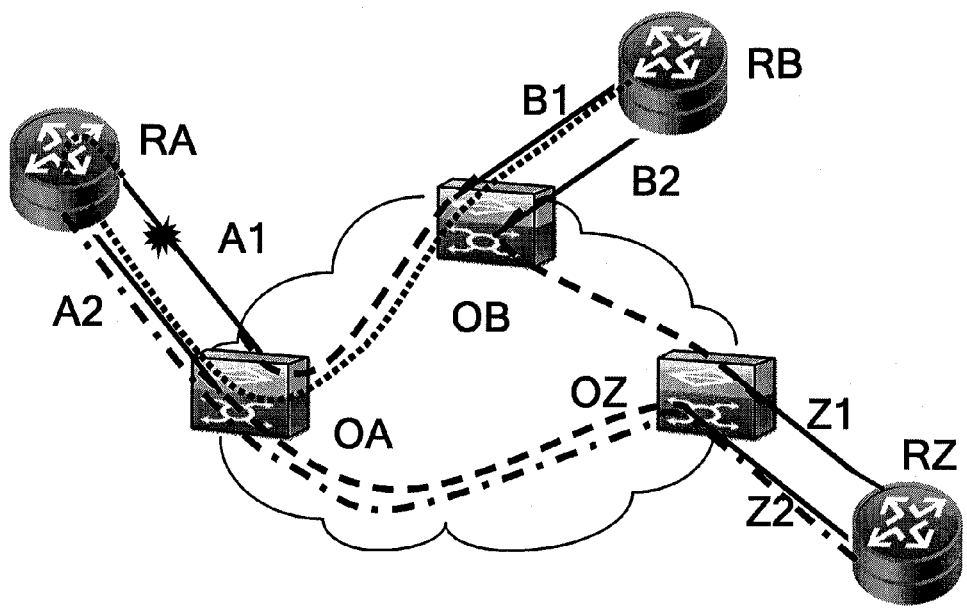
FIG. 5 shows route recovery based on the multi-port load sharing method in an embodiment of the present invention.

FIG. 5 shows route recovery based on the multi-port load sharing method in an embodiment of the present invention. When the UNI links A1 and A2 between the data device RA and the optical device OA are normal, and because the MP4 solution under the present invention is applied, the route from the data device RA to the data device RB includes RA→A1→OA→OB→B1→RB and RA→A2→OA→OB→B1→RB. When the UNI link A1 fails, the route is not disconnected between RA and RB. The data device RA updates the load sharing group information in the local logical port table according to the fault. When the RA receives packets destined for RB, RA searches an address port mapping table for corresponding logical egress port information according to RB address information carried in the packet; and searches a logical port table for information about a load sharing group according to the logical egress port information, where the load sharing group includes only the physical port corresponding to the UNI link A2. The data device RA encapsulates the packets into at least one physical subchannel corresponding to the physical port according to a preset load sharing policy, and forwards the packets to the optical device OA through the physical port and the UNI link A2, whereupon the packets are forwarded to RB along this route: OA→OB→B1→RB. In this application instance, RA encapsulates the packets into the physical subchannels corresponding to the UNI link A2, and forwards the packets to RB by using the existing optical channel between OA and OB. In the packet transmission process, neither the data device RA nor the optical device OA requires protection switching; and the route between RA and RB is RA→A2→OA→OB→B1→RB, therefore avoiding occupation of network resources of OA→RZ and RZ→RB.

Through comparison between the two implementation methods above, it is evident that the networking based on the MP4 technology may isolate the fault in the network when the UNI link fails, restrict the impact of the UNI link fault to a single node, and maintain the existing route in the network, therefore saving network resources and avoiding network oscillation. The solution disclosed in this embodiment draws upon the advantages of interaction between the data device and the optical device, and achieves the protection effect without switching the device or the link.

Application Instance 2

Here is an application instance of using the multi-port load sharing method under the present invention to enhance UNI link protection.

As shown in FIG. 3, the link from D-P2 to O-P2 fails, which may be caused by a failure in the D-P2 port, a failure in the O-P2 port, or a failure of the fiber between the D-P2 port and the O-P2 port. Although the physical subchannels SC-3 and SC-4 corresponding to the link fail, the packets transmitted through the physical port O-P3 of the optical device may still be encapsulated in the physical subchannel SC-2, forwarded through the physical port D-P1 of the data device 101 to the physical port O-P1 of the optical device, and then transmitted from the physical port O-P1 of the optical device to the physical port O-P3. Likewise, the packets transmitted through the physical port O-P4 of the optical device may still be encapsulated in the physical subchannel SC-1, forwarded through the physical port D-P1 of the data device 101 to the physical port O-P1 of the optical device, and then transmitted from the physical port O-P1 of the optical device to the physical port O-P4.

Therefore, after the link fails, neither the data device nor the optical device requires switching operation, and no extra protection resources are required, but the protection purpose is fulfilled.

Figure 6:
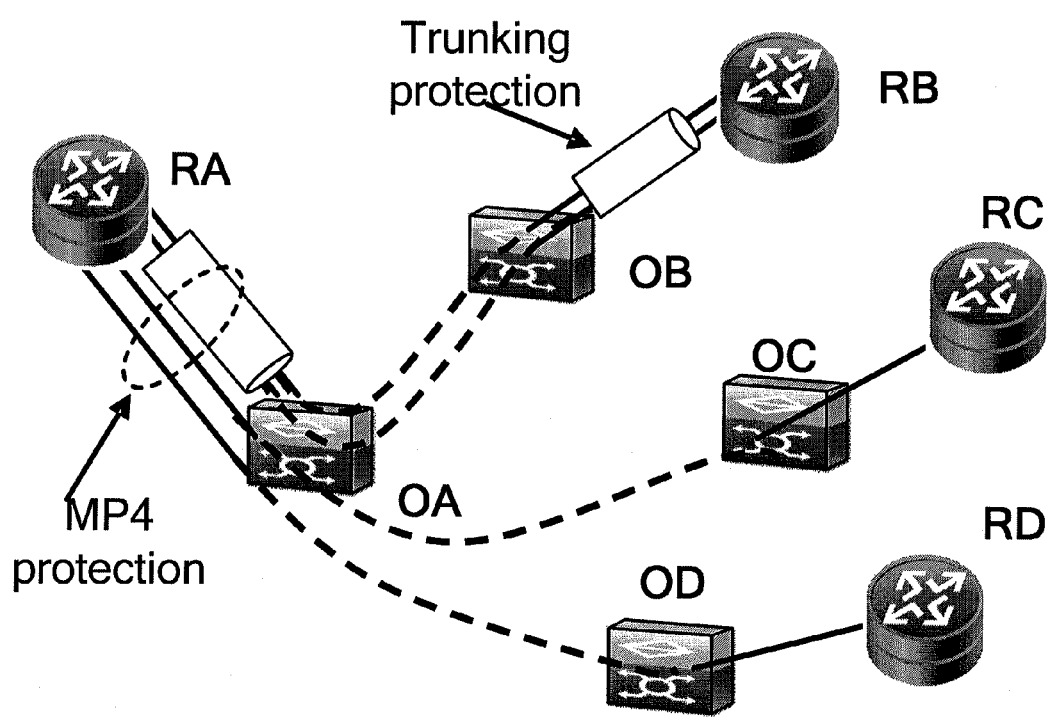
FIG. 6 shows UNI link protection based on the multi-port load sharing method in an embodiment of the present invention.

FIG. 6 shows UNI link protection based on the multi-port load sharing method in an embodiment of the present invention. FIG. 6 shows differences between MP4 protection and trunking protection. As shown in FIG. 6, the UNI link based on the MP4 group may protect all UNI links between the data device and the optical device, without being limited; but the trunking protection is limited to the UNI links directed to the same destination address.

In the MP4 solution, all ports in the group protect each other mutually, and more ports lead to more protective ports. Even if most UNI links fail, as long as one link is normal, the packets forwarded through this data device can arrive at the destination without protection switching. The protected UNI links may be directed to different destinations.

As shown in FIG. 2, the multi-port load sharing method in this embodiment may implement adaptive adjustment of the load carried on the physical subchannels corresponding to different physical ports in the same MP4 group. When a physical port fails, the physical subchannels corresponding to other normal physical ports in the same MP4 group may share the load on the physical subchannels corresponding to the faulty physical port. The packets destined for the same destination are sent through multiple physical subchannels corresponding to different physical ports. Therefore, the corresponding physical port of the optical device may still receive the packets, and the traffic remains unchanged after the fault occurs if the capacity of the physical subchannels has an enough redundancy, therefore, the network reliability is improved.

Application Instance 3

Here is an application instance of UNI link protection for multiple network devices based on the multi-port load sharing method under the present invention.

Figure 7:
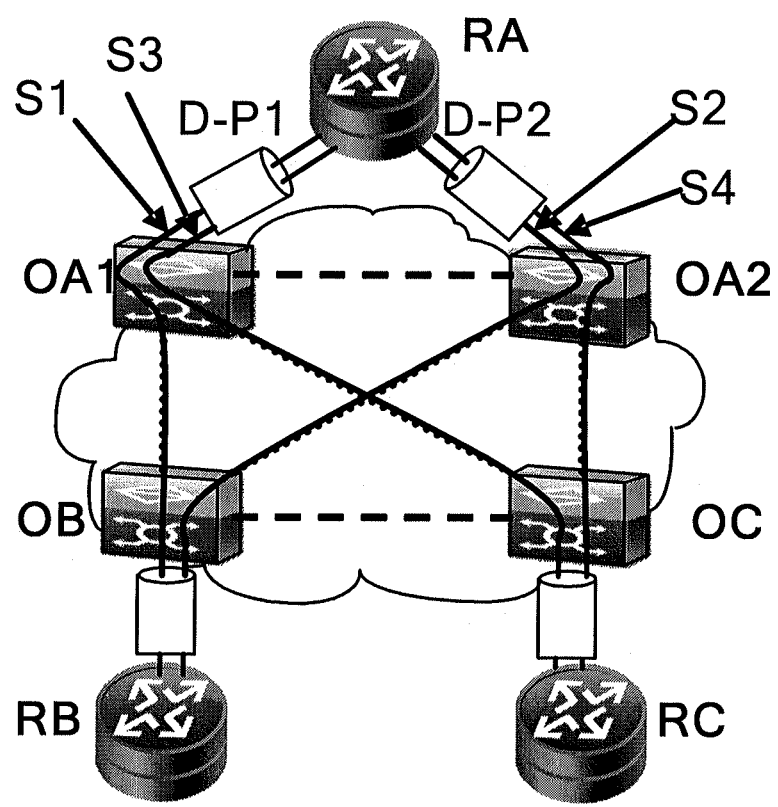
FIG. 7 shows an application instance of UNI link protection for multiple network devices based on the multi-port load sharing method in an embodiment of the present invention.

As shown in FIG. 7, it is assumed that the data device is a router. The router RA has two physical ports: D-P1 and D-P2, which are connected to different optical devices OA1 and OA2 respectively. The RA needs to set up two links to the routers RB and RC. Likewise, the physical ports D-P1 and D-P2 may be configured as MP4 port groups.

The router RA may forward the packets to the RB through two routes marked as S1 and S2. The route S1 is RA→OA1→OB→RB; and the route S2 is RA→OA2→OB→RB. Specifically, the RA encapsulates the packets forwarded to the RB into at least one physical subchannel corresponding to the physical ports D-P1 and D-P2 respectively according to the preset load sharing policy. Afterwards, the packets encapsulated in the physical subchannel corresponding to the physical port D-P1 are forwarded to the optical device OA1 through the physical port D-P1; the packets encapsulated in the physical subchannel corresponding to the physical port D-P2 are forwarded to the optical device OA2 through the physical port D-P2; and then the packets are transmitted to the optical device OB through the optical devices OA1 and OA2 respectively, and the optical device OB aggregates the packets from the two different routes and forwards them to the router RB through the physical port of the same optical device. Therefore, even if the UNI link fails between the router RA and the optical device OA1 and the route S1 is disconnected as a result, the packets forwarded from the router RA to the router RB may still be forwarded along the route S2, namely, forwarded from the router RA to the optical device OA2 and then transmitted from the optical device OA2 to the router RB, therefore the protection purpose is fulfilled. The data link protection mechanism from the router RA to the router RC is the same as the data link protection mechanism from the router RA to the router RB, and the packets may be transmitted on the routes S3 and S4 which share load.

It is evident that the protection capability is enhanced when the multi-port load sharing method under the present invention is applied to the UNI link protection of multiple network devices. Therefore, this application provides protection not only against the UNI link fault, but also against the fault of the node in the network device. As shown in FIG. 7, the protection is effective for both the optical device OA1 and OA2 no matter whether the fault lies in the port of the device or lies in the device itself. In actual network application, the multi-port load sharing method under the present invention may also be applied to the UNI link protection between more than one data device and more than one optical device.

Application Instance 4

Here is an application instance of using the multi-port load sharing method under the present invention to reduce the required number of physical ports.

On a core backbone network, in order to improve the network reliability, a mesh network topology is always applied. In such a topology, the nodes of the network are interconnected with each other, and many high-capacity ports are required, but the services occupy only a small percentage of the total bandwidth. The optical device connected with the data device requires many ports on the client side, and requires a huge number of physical ports on the line side. Therefore, it is important to reduce the required number of ports.

Figure 8:
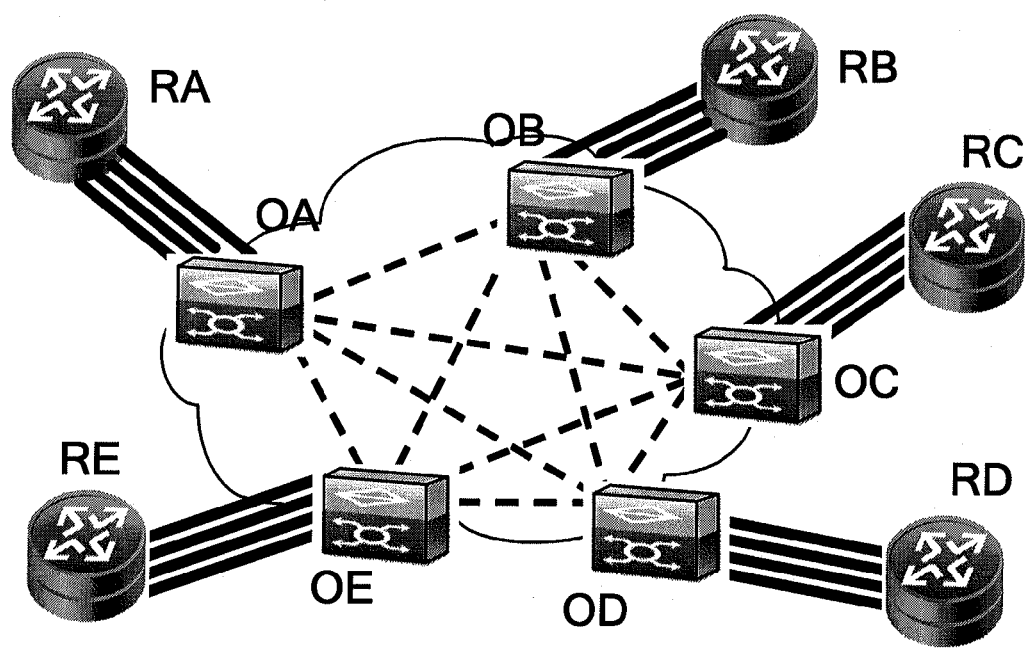
FIG. 8 shows port connection in an application instance not based on the multi-port load sharing method in an embodiment of the present invention.
Figure 9:
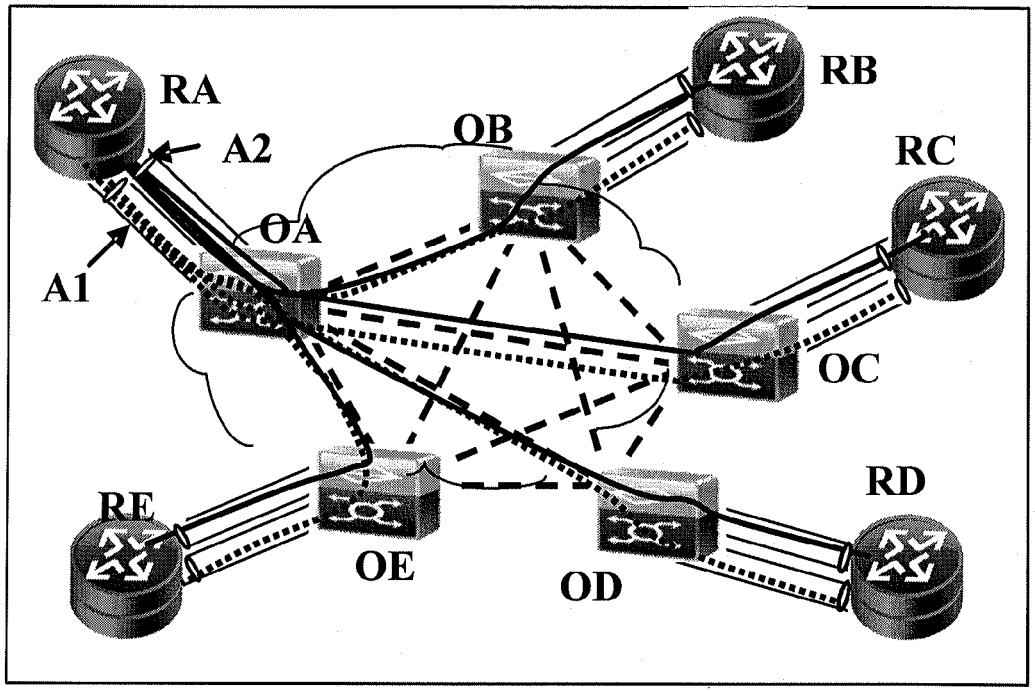
FIG. 9 shows port connection in an application instance based on the multi-port load sharing method in an embodiment of the present invention.

FIG. 8 shows port connection not based on the MP4 solution. FIG. 9 shows port connection based on the MP4 solution. Through comparison between FIG. 8 and FIG. 9, it is evident that after the MP4 solution is applied, the number of physical ports required by the data device and the optical device is slashed. FIG. 8 and FIG. 9 show a mesh network that includes five nodes. Before the MP4 solution is applied, each router requires four physical ports connected with the optical device; after the MP4 solution is applied, taking the RA as an example, as shown in FIG. 9, the RA sets a load sharing group composed of the physical port of A1 and the physical port of A2, where A1 is a UNI link formed through connection with the OA, and A2 is a UNI link formed through connection with the OA. Therefore, the packets sent from the RA to any data device in RB, RC, RD, or RE may be encapsulated in at least one physical subchannel corresponding to UNI link A1 and UNI link A2 respectively and sent to the optical device OA through the UNI link A1 and the UNI link A2, and then the packets are forwarded by the OA to the corresponding data device. Therefore, each router is connected with the optical device through only two physical ports configured into a load sharing group so that the router is connected with the other four routers respectively, therefore, high network reliability is provided and the required number of physical ports is reduced.

As shown in FIG. 9, in the mesh network simply composed of five nodes in FIG. 9, the router saves up to 10 ports, and the optical device saves up to 10 ports too. With the increase of the network nodes, more physical ports are saved.

The multi-port load sharing method under the present invention also reduces the initial investment and accomplishes smooth expansion.

The comparison between FIG. 8 and FIG. 9 reveals another benefit of the MP4 solution. At the beginning of network construction, the service capacity is not high, but a highly reliable mesh network needs to be set up. If the MP4 solution is not applied, plenty of boards need to be configured at the beginning of network construction to accomplish interconnection. As a result, the capacity of the configured ports are largely idle, which reduces the investment income. After the MP4 solution is applied, the purpose can be fulfilled with only one high-capacity port. When the service capacity increases to be greater than the capacity of one port, a new port is added. Therefore, the investment income is improved, and the capacity is expanded smoothly with growth of services.

Application Instance 5

Here is an application instance of using the multi-port load sharing method under the present invention to eliminate direct correlation between the interconnection bandwidth of the data device and the port capacity.

Figure 10:
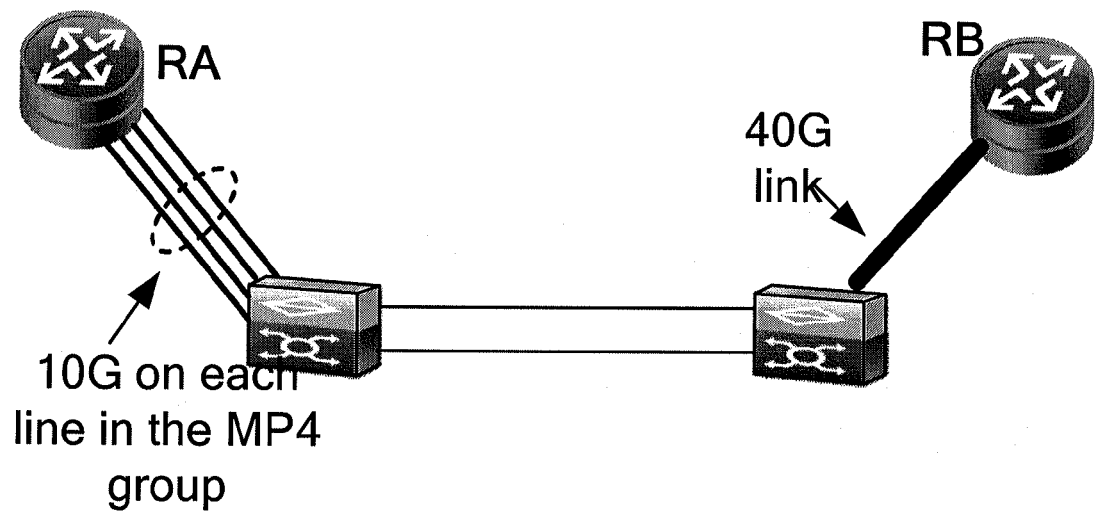
FIG. 10 shows an application instance of interconnecting data devices of ports of different capacities based on the multi-port load sharing method in an embodiment of the present invention.

As shown in FIG. 10, the router RA has only a 10G physical port, and the router RB has a 40G physical port. After the MP4 solution is applied, the RA is interconnected with the RB through 40G bandwidth, and the RB does not require any service board of a 10G rate.

In the current network, the logical interconnection between data devices and the interconnection between the data device and the optical device are only practicable when the physical ports have the same capacity. After the MP4 solution is applied, the logical interconnection bandwidth between the data devices may be accomplished flexibly in many modes, and even low-end products (without high-capacity ports) may be connected with high-end products at high rates through aggregation of the physical subchannels.

Application Instance 6

Here is an application instance of using the multi-port load sharing method under the present invention to implement a tunnel solution superior to Traffic Engineering (TE).

In the current Multi-Protocol Label Switching (MPLS) network, hop-by-hop deployment is required on the router in order to set up end-to-end TE. The more intermediate routers there are, the more complex the implementation of the TE is, and the more resources are wasted.

Figure 11:
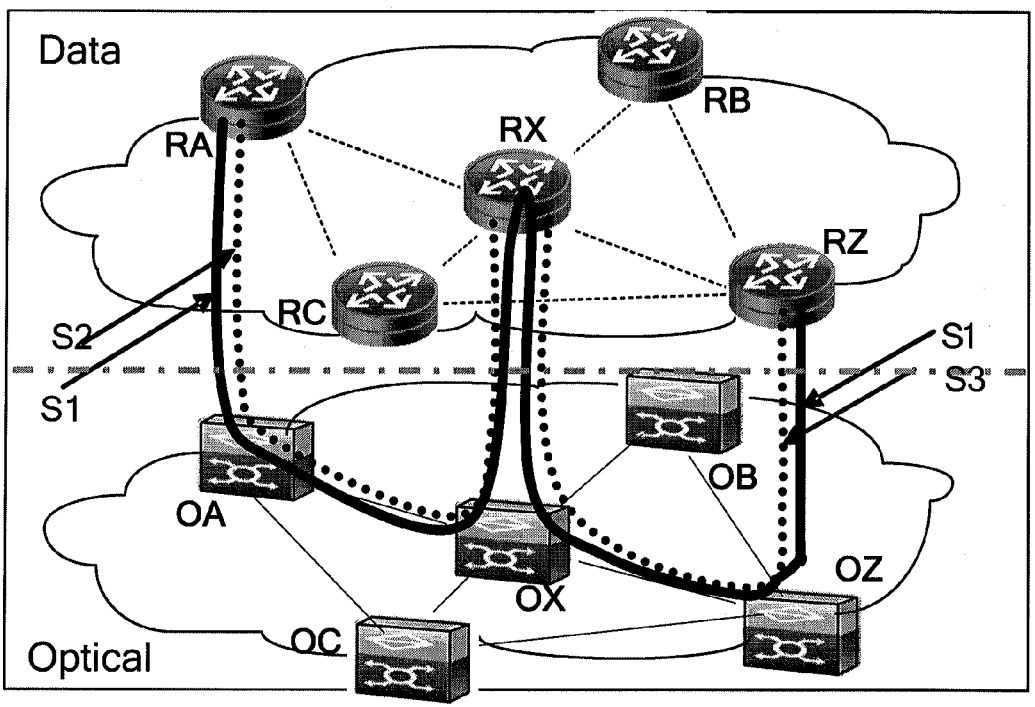
FIG. 11 shows an application instance of setting up a tunnel not based on the multi-port load sharing method in an embodiment of the present invention.
Figure 12:
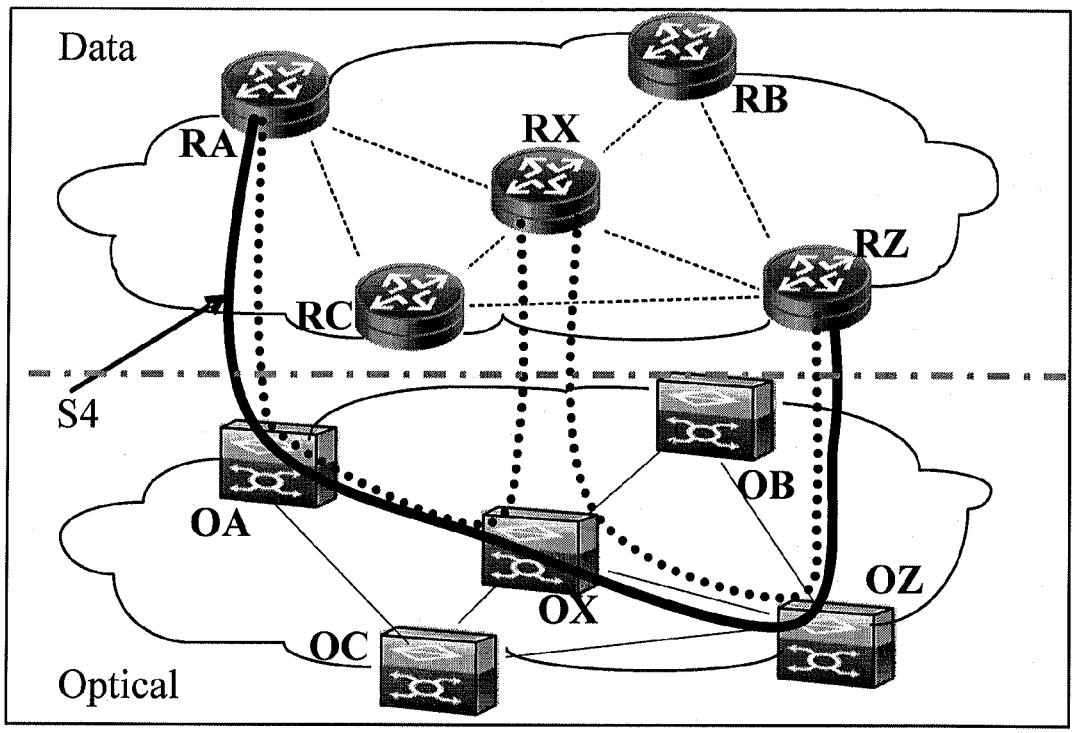
FIG. 12 shows an application instance of setting up a tunnel based on the multi-port load sharing method in an embodiment of the present invention.

FIG. 11 shows the effect before the MP4 solution is applied. FIG. 12 shows the effect after the MP4 solution is applied. In FIG. 11 and FIG. 12, an RA-RZ tunnel needs to be set up. The route S1 in FIG. 11 indicates the physical route of the tunnel; S2 and S3 indicate single-hop routes which share the physical channel with the tunnel but have different subchannels. After the MP4 solution under the present invention is applied, the tunnel may be implemented through the physical subchannel S4 of the optical device directly, and no intermediate router is required, therefore, data device resources are massively saved.

Evidently, after the MP4 solution is applied, plenty of physical resources are saved. Because a direct channel is set up through the optical layer, the QoS of the tunnel is enhanced significantly, without being affected by intermediate routers.

Persons skilled in the art should understand that all or part of the steps of the method under the present invention may be implemented by a program instructing relevant hardware. The program may be stored in a computer readable storage medium. When the program runs, the steps of the method specified in any of the embodiments above may be performed. The storage medium may be a magnetic disk, CD-ROM, Read-Only Memory (ROM), or Random Access Memory (RAM).

Figure 13:
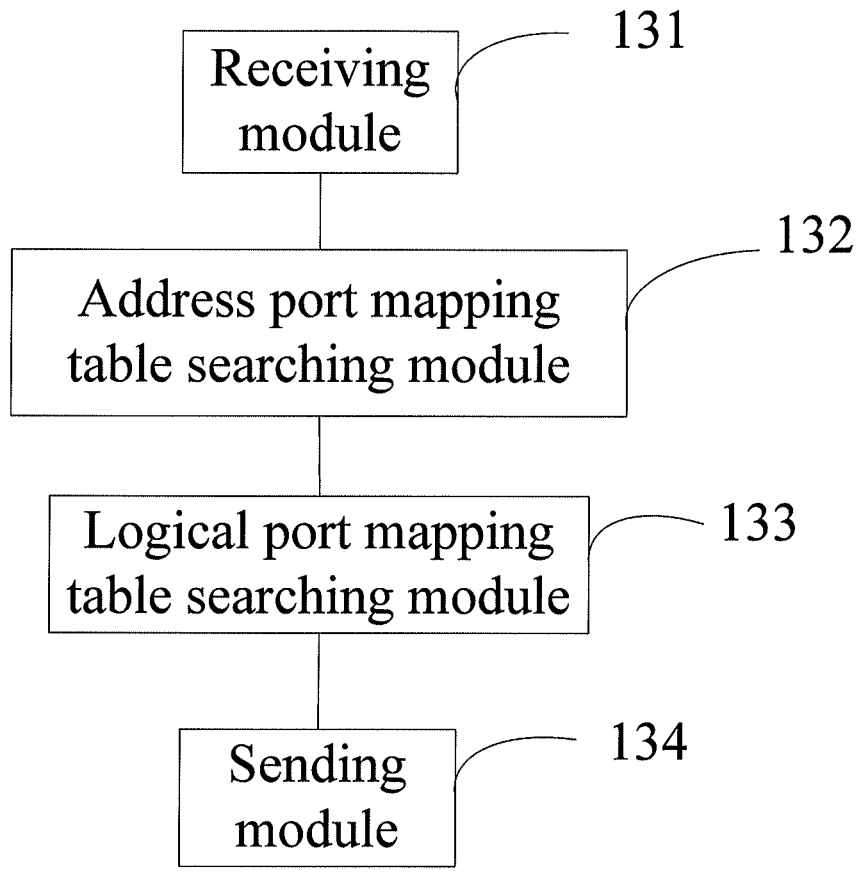
FIG. 13 shows a structure of a data device for implementing multi-port load sharing in an embodiment of the present invention.

As shown in FIG. 13, a data device for implementing multi-port load sharing in an embodiment of the present invention includes:

a receiving module 131, configured to receive packets destined for a destination;

an address port mapping table searching module 132, configured to search an address port mapping table for corresponding logical egress port information according to destination address information carried in the packets;

a logical port table searching module 133, configured to search a logical port table for information about a corresponding load sharing group according to the logical egress port information, where the load sharing group includes at least two physical ports and each physical port corresponds to at least two physical subchannels; and a sending module 134, configured to encapsulate the packets into at least one physical subchannel corresponding to each physical port in the load sharing group respectively according to a preset load sharing policy, and forward the packets to the destination through the corresponding physical port.

Optionally, the subchannels corresponding to the physical ports in this embodiment of the present invention are not limited to the physical subchannels, but may be logical subchannels, or may include both logical subchannels and subchannels of a physical-layer transmission frame structure. Specifically, the subchannels include: Optical Distribution Unit (ODU) series corresponding to the OTN interface, and VC-4 series corresponding to the POS interface, or channelized interfaces corresponding to the 100GE interface.

The data device provided in this embodiment may be a router or switch. The data device may implement multi-port load sharing according to the method shown in FIG. 2.

Figure 14:
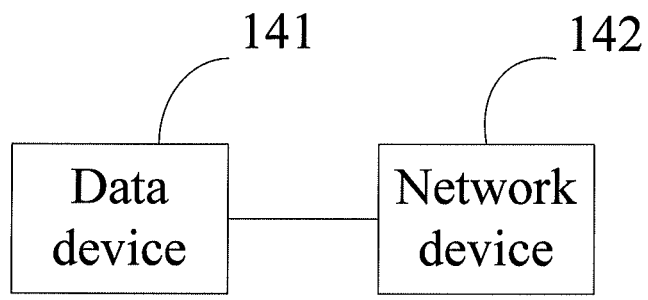
FIG. 14 shows a structure of a network system for implementing multi-port load sharing in an embodiment of the present invention.

As shown in FIG. 14, a network system for implementing multi-port load sharing in an embodiment of the present invention includes a data device 141 and a network device 142.

The data device 141 is configured to: receive packets destined for a destination; search an address port mapping table for corresponding logical egress port information according to destination address information carried in the packets; search a logical port table for information about a corresponding load sharing group according to the logical egress port information, where the load sharing group includes at least two physical ports and each physical port corresponds to at least two physical subchannels; and encapsulate the packets into at least one physical subchannel corresponding to each physical port in the load sharing group respectively according to a preset load sharing policy, and forward the packets to the network device 142 through the corresponding physical port.

The network device 142 is configured to aggregate the packets according to a sending direction of the packets and then send the packets to the destination, or send the packets to the destination directly.

Optionally, the subchannels corresponding to the physical ports in this embodiment of the present invention are not limited to the physical subchannels, but may be logical subchannels, or may include both logical subchannels and subchannels of a physical-layer transmission frame structure.

Further, the network device 142 is an optical device, and the data device may be a router or switch. The network system in this embodiment may implement multi-port load sharing according to the method shown in FIG. 2, and form various topologies according to the networking modes illustrated in application instance 1 to application instance 6.

Through the data device and network system provided herein, in the same MP4 group, the load is shared by at least one physical subchannel corresponding to more than one physical port respectively, and the load arrives at the same network device port through different subchannels. When a UNI link fails, the packets may arrive at the destination address through other subchannels, therefore, the embodiments improve the network reliability and as a result the UNI links connected to different destinations are protected. The packets may be transmitted through multiple physical subchannels in multiple physical ports, therefore, the embodiments solve the problem of deficient large-capacity ports in a core network, reduce initial investments at the stage of network construction, and accomplish smooth expansion.

The above descriptions are merely exemplary embodiments of the present invention, but not intended to limit the scope of the present invention. Any modifications, variations, or replacements that may be easily derived by those skilled in the art should fall within the protection scope of the present invention. Therefore, the protection scope of the present invention is subject to the appended claims.

What is claimed is:

1. A multi-port load sharing method, comprising:
receiving packets destined for a destination;
searching an address port mapping table for corresponding logical egress port information according to destination address information carried in the packets;
searching a logical port table for information about a corresponding load sharing group according to the logical egress port information, wherein the load sharing group comprises at least two physical ports and each physical port corresponds to at least two physical subchannels; and
encapsulating the packets into at least one physical subchannel corresponding to each physical port in the load sharing group respectively according to a preset load sharing policy, and forwarding the packets to the destination through the corresponding physical port.

2. The multi-port load sharing method according to claim 1, wherein the forwarding the packets to the destination through the corresponding physical port comprises:
sending the packets destined for the destination to a transport network through the corresponding physical port, aggregating the packets through the transport network according to a sending direction of the packets, and forwarding the packets to the destination, or forwarding the packets to the destination directly.

3. The multi-port load sharing method according to claim 1, wherein:
the physical subchannels in different physical ports have the same capacity or different capacities.

4. The multi-port load sharing method according to claim 1, wherein:
the physical ports have the same capacity.

5. The multi-port load sharing method according to claim 1, wherein:
the capacity of the logical egress port is the same as the capacity of the physical port.

6. The multi-port load sharing method according to claim 1, wherein the destination address information is one of:
an Internet Protocol (IP) address of the destination, and the address port mapping table is a routing table; and
a Media Access Control (MAC) address of the destination, and the address port mapping table is a MAC table.

7. The multi-port load sharing method according to claim 1, wherein:
the physical subchannels are subchannels of a physical layer transmission frame structure and comprise:
Optical Data Unit (ODU) series corresponding to an OTN interface, Virtual Container (VC-4) series corresponding to an POS interface, or an channelized interface corresponding to an 100GE interface.

8. The multi-port load sharing method according to claim 1, wherein:
the physical ports have different capacities.

9. The multi-port load sharing method according to claim 1, wherein:
the capacity of the logical egress port is different from the capacity of the physical port.

10. A data device for implementing multi-port load sharing, comprising a processor and a non-transitory storage medium configured to store instructions causing the processor configured to perform acts comprising:
receiving packets destined for a destination;
searching an address port mapping table for corresponding logical egress port information according to destination address information carried in the packets;
searching a logical port table for information about a corresponding load sharing group according to the logical egress port information, wherein the load sharing group comprises at least two physical ports and each physical port corresponds to at least two physical subchannels; and
encapsulating the packets into at least one physical subchannel corresponding to each physical port in the load sharing group respectively according to a preset load sharing policy, and forward the packets to the destination through the corresponding physical port.

11. The data device according to claim 10, wherein:
the physical subchannels are subchannels of a physical layer transmission frame structure and comprise:
Optical Data Unit (ODU) series corresponding to an OTN interface, Virtual Container (VC-4) series corresponding to an POS interface, or an channelized interface corresponding to an 100GE interface.

12. A network system, comprising a data device and a network device, wherein:
the data device, configured to: receive packets destined for a destination; search an address port mapping table for corresponding logical egress port information according to destination address information carried in the packets; search a logical port table for information about a corresponding load sharing group according to the logical egress port information, wherein the load sharing group comprises at least two physical ports and each physical port corresponds to at least two physical subchannels; and encapsulate the packets into at least one physical subchannel corresponding to each physical port in the load sharing group respectively according to a preset load sharing policy, and forward the packets to a network device through the corresponding physical port; and
the network device, configured to aggregate the packets according to a sending direction of the packets and then send the packets to the destination.

13. The network system according to claim 12, wherein:
the network device is an optical device, and the data device is a router or a switch.

* * * * *